(12) United States Patent
Basa

(10) Patent No.: US 6,426,110 B1
(45) Date of Patent: Jul. 30, 2002

(54) LOW-CARBOHYDRATE HIGH-PROTEIN CREAMER POWDER

(75) Inventor: Almario C. Basa, Anaheim, CA (US)

(73) Assignee: Global Health Sciences, Inc., Anaheim, CA (US)

(*) Notice: Subject to any disclaimer, the term of this patent is extended or adjusted under 35 U.S.C. 154(b) by 0 days.

(21) Appl. No.: 09/638,518

(22) Filed: Aug. 11, 2000

(51) Int. Cl.⁷ .................................................. A23C 9/16
(52) U.S. Cl. ...................................... 426/588; 426/657
(58) Field of Search ................................ 426/588, 585, 426/586, 657, 594–596

(56) References Cited

U.S. PATENT DOCUMENTS

| | | | |
|---|---|---|---|
| 4,046,926 A | | 9/1977 | Gardiner |
| 4,415,600 A | | 11/1983 | Miller et al. |
| 4,446,164 A | | 5/1984 | Brog |
| 4,689,245 A | | 8/1987 | Kosikowski et al. |
| 4,692,338 A | * | 9/1987 | Irvine et al. |
| 5,128,167 A | * | 7/1992 | De Laporte |
| 5,284,674 A | | 2/1994 | Fazio |
| 5,318,793 A | * | 6/1994 | Melachouris et al. |
| 5,792,501 A | * | 8/1998 | Lepine |
| 5,882,714 A | * | 3/1999 | Lepine |
| 5,993,873 A | * | 11/1999 | Kuslys et al. |
| 6,020,017 A | | 2/2000 | Mingione |
| 6,048,567 A | * | 4/2000 | Villagran et al. |
| 6,168,819 B1 | * | 1/2002 | Zeller et al. |

FOREIGN PATENT DOCUMENTS

| | | | |
|---|---|---|---|
| EP | 0333288 | * | 3/1989 |
| WO | WO 98/07329 | | 2/1998 |
| WO | WO 00/44238 | * | 8/2000 |

OTHER PUBLICATIONS

Von Loesecke, Harry. 1943. Drying and Dehydration of Foods. Reinhold Publishing Corporation, New York, New York. p. 155.*

* cited by examiner

*Primary Examiner*—Carolyn Paden
(74) *Attorney, Agent, or Firm*—Lyon & Lyon LLP

(57) ABSTRACT

A composition for a creamer powder is disclosed that comprises approximately 40% to approximately 60% by weight water-soluble protein, edible fat, at least one emulsifier, at least one stabilizer and less than 5% by weight carbohydrate. The creamer powder composition is dispersible in either hot or cold water-based liquids. The low-carbohydrate high-protein creamer powder may be used in the preparation of nutritious, low-carbohydrate foods.

15 Claims, No Drawings

LOW-CARBOHYDRATE HIGH-PROTEIN CREAMER POWDER

FIELD OF THE INVENTION

This invention relates to the field of dry creamer powders for use in the food industry.

BACKGROUND OF THE INVENTION

Dry creamer powders are useful in the food industry as an economical and convenient replacement for liquid dairy products. As compared with liquid milk or cream, dry creamer powders have increased stability and ease of handling. A common use for creamer powders is their addition to hot beverages such as coffee or tea, where they provide a visual whitening effect and a palatable improvement. Creamer powders are further utilized as a milk substitute in the preparation of diverse food products such as sauces, beverages, shakes, foaming beverages, soups, salad dressings, food coatings, baked goods, puddings, confections, ice cream, frozen confections, and non-baked food products.

Compositions for dry creamer powders generally are known. A creamer powder composition usually comprises a dried emulsion of carbohydrate, fat or oil, and protein with added emulsifiers, stabilizers, and/or buffers. Most creamer powders are designed to be soluble in hot beverages. For example, U.S. Pat. No. 4,046,926 describes a typical hot-water soluble, non-dairy creamer composition that includes (by weight) 35–65% carbohydrate, 20–40% fat, 3–15% protein, emulsifiers and stabilizers. An example of a creamer powder that is soluble in cold water is described in publication WO 98/07329. This publication discloses a creamer powder composition that includes (by weight). 30–70% carbohydrate, 25–45% fat and 0.5–6% protein, emulsifiers and stabilizers. A creamer powder, whether soluble in hot or cold water, typically has carbohydrate and fat as major components by weight, and protein is a relatively minor component.

The edible fat in a creamer powder composition may be a fat or oil derived from animals or plants. Most typically, the edible fat is a vegetable fat or oil that is bland and neutral in taste. Coconut oil, for example, has been widely used. The WO 98/07329 publication discloses a cold water soluble creamer powder that uses sunflower oil, canola oil, or rapeseed oil.

Currently, an emphasis exists on the restriction of carbohydrate in the human diet as an aid to weight reduction. Restriction of carbohydrates in foods also may be recommended for people with medical conditions such as diabetes, epilepsy, and inherited disorders of carbohydrate metabolism. It is generally accepted in the food industry, however, that creamer powders contain a range of 30%–70% by weight carbohydrate for flavor, bulking or stability of the powdered emulsion. Few creamer powders have a carbohydrate content lower than 35% by weight. U.S. Pat. No. 6,020,017 discloses a range of 5–35% carbohydrate, and U.S. Pat. No. 4,446,164 discloses a range of 5%–40% carbohydrate.

Therefore, a need exists in the food industry for a creamer powder that is low in carbohydrate content for the preparation of nutritious, carbohydrate-restricted foods.

It is the principal object of the present invention to provide a composition for a creamer powder that has a low carbohydrate content.

The source of water-soluble protein in powdered creamers is usually a milk product, such as sodium caseinate (U.S. Pat. No. 4,046,926), whey protein (U.S. Pat. No. 4,446,164), or dry milk solids (U.S. Pat. No. 5,284,674). Although alternative sources of water-soluble proteins are known, these patents each disclose unsuccessful attempts to replace sodium caseinate with other water-soluble proteins in creamer powder compositions. Further, the '674 patent discloses that calcium caseinate is insoluble and is not preferred for use in a creamer powder.

U.S. Pat. No. 4,415,600 teaches that improved whitening can be obtained by replacing an amount of the sodium caseinate, up to 60%, with a soy protein derivative such as soy protein isolate, soy protein concentrate, or modified soy flour. However, the total protein in this creamer powder composition is only 5.25% by weight.

It is a further object of the present invention to provide a composition for a creamer powder that is low in carbohydrate and high in protein content.

It is a further object of the present invention to provide a composition that allows for variation in the source of soluble protein.

It is a further object of the present invention to provide a composition for a creamer powder that is low in carbohydrate and high in protein content by weight, and disperses easily in either hot or cold water-based liquids.

SUMMARY OF THE INVENTION

According to the present invention, the carbohydrate component of a dry creamer powder composition can be decreased significantly relative to the protein and fat components. Combinations of water-soluble protein, carbohydrate, and edible fat, appropriately emulsified and stabilized, can be processed to form a creamer powder that has less than approximately 5% carbohydrate by weight. Preferably, the creamer powder is stable in powder form, and also may be easily dispersed in hot or cold water-based liquids.

The creamer powder in one embodiment comprises high oleic vegetable oil as the preferred edible fat and calcium caseinate as the preferred water-soluble protein. In another embodiment, the creamer powder composition utilizes sources of water-soluble proteins other than milk-derived casein proteins. In yet another embodiment, the creamer powder composition contains mixtures of animal and plant water-soluble proteins.

The creamer powder may be utilized as an ingredient in foods where reduction of carbohydrate content and a nutritious food product are desired. Three embodiments disclose the use of the present invention as an ingredient in dry mix soup compositions. A further embodiment discloses the utilization of the creamer powder in a beverage.

The present invention may be useful in the preparation of foods, not only for people desiring weight reduction, but also for people with medical conditions requiring restriction of carbohydrate intake.

DETAILED DESCRIPTION OF THE INVENTION

According to the present invention, the carbohydrate component is decreased significantly relative to the protein and fat components of a dry creamer powder. Combinations of edible fat, water-soluble protein, carbohydrate and optional additives, appropriately emulsified and stabilized, are disclosed to form a creamer powder that has less than approximately 5% carbohydrate by weight.

The creamer powder of the present invention may contain from about 30% to 70% by weight of an edible fat component. The content of edible fat preferably ranges from about 40% to about 55%. Very preferably, the edible fat content is approximately 50%.

Edible fats suitable for use may include fats or oils from animal and/or vegetable sources. These edible fats may include saturated fats, monounsaturated fats, and/or polyunsaturated fats. A vegetable oil, preferably a monounsaturated vegetable oil, is favored.

The mono-unsaturated vegetable oil is very preferably non-hydrogenated to limit the content of trans fatty acids. Partially hydrogenated vegetable fats or oils may produce trans fatty acids. Since trans fatty acids are associated with an increase in low-density lipoproteins (LDL) in vivo, they should be restricted in nutrition for good health.

The term "long length fatty acids" as used herein refers to fatty acids with hydrocarbon chains ranging from fourteen to twenty-two carbons in length.

It is further preferred that the vegetable oil contains a high content by weight of oleic fatty acids. Oleic acid is an unsaturated fatty acid with a hydrocarbon chain that is eighteen carbons in length. The oleic acid fatty acid content of the vegetable oil preferably is at least 70% by weight. It is most preferred that the oleic acid content of the vegetable oil is approximately 85% by weight.

Monounsaturated, non-hydrogenated vegetable oils that are very preferred comprise sunflower oil, soybean oil, and canola oil. For example, a particularly preferred non-hydrogenated, mono-unsaturated sunflower oil is "TRI-SUN Extra AS100" from Ingredients International (AC Humko, 1115 Tiffany St., Boyceville, Wis. 54725). As described by the manufacturer, this oil is a high oleic sunflower oil extracted from traditionally crossbred sunflower crops and exhibits much greater stability than regular sunflower oil. The oleic fatty acid content is about 85%. It is low in saturated fat, contains no trans fatty acids, and has a neutral odor and taste. Tocopherol has been added to TRI-SUN Extra AS100 for oxygen stability without hydrogenation.

Alternatively, an oleic safflower oil that is known to be very stable also is very preferable for use in the present invention. For example, "Oleic safflower oil RBD" (Ingredients International, AC Humko) is a naturally stable liquid oil that has at least 75% by weight oleic acid. "Oleic safflower oil RBD" is a non-hydrogenated oil that is low in saturated fatty acids, has no trans fatty acids, and is high in mono-unsaturated fatty acids. It has a bland flavor, is growth hormone free, and is low in sodium.

The term "water-soluble protein" as used herein is defined as protein that is soluble in water-based liquids. The creamer powder of the present invention contains from about 40% to about 60% by weight of a water-soluble protein. The protein content preferably is about 40% to 50%. Very preferably, the protein content is approximately 45%.

The water-soluble protein component may be derived from animal protein and/or plant protein. The protein may be processed to improve its solubility in water; for example, hydrolyzed protein may be used in the present invention.

Animal proteins usable in the composition preferably comprise egg proteins, albumin, collagen, gelatin, and/or milk-derived proteins comprising casein, caseinate soluble protein, whey protein and/or demineralized whey protein.

For example, any of the caseinate soluble proteins comprising calcium caseinate, potassium caseinate, magnesium caseinate, and/or sodium caseinate may be used in the present invention. Calcium caseinate preferably is used. A source of calcium caseinate very preferred is "Alanate 385," specification #13C385, from New Zealand Milk Products, Inc. (3637 Westwind Blvd., Santa Rosa, Calif. 95403). As described by the manufacturer, "Alanate 385" is a spray dried milk protein manufactured from fresh skim milk and surface treated with food grade glycerol mono-oleate. It is readily dispersible in water to form a stable colloidal suspension. "Alanate 385" has less than 0.01% sodium and exhibits excellent flavor stability. It is kosher, lactose-free, and recombinant growth hormone (rbGH) free, which is advantageous to meet consumer concerns.

Plant protein may be used in the present invention as the total protein component. Plant protein also may be used in various combinations as a mixture with animal protein in the present invention. Water-soluble proteins suitable for use in the present invention may be derived from plants. Nuts and seeds, as well as marine plants, can be used. Water-soluble proteins are preferably derived from the plants comprising bean, peanut, soybean, sunflower, flax, canola, oat, pea, wheat, and/or rice. The plant sources for water-soluble proteins most preferred comprise soybean, canola, sunflower and/or rice.

Carbohydrate may be included in the present invention only as needed and/or desired for quality, flavor characteristics and/or ease of production. Preferably, the carbohydrate content comprises less than 5% by weight of the creamer powder composition. The content of carbohydrate preferably ranges less than 3%. Very preferably, the carbohydrate content is less than 1% by weight of the creamer powder composition. Carbohydrate sources typically used in creamer powder compositions comprising corn syrup solids, fructose, maltose, and/or sucrose may be used in the present invention.

Any of the food approved emulsifiers typically used in creamer powders comprising mono-and diglycerides of fatty acids, lecithin, and soy lecithin may be used in the present invention. The content of mono- and diglycerides preferably ranges from about 2% to about 10% by weight of the creamer powder composition. The content of lecithin preferably is between 0% and 2%. Very preferably, mono- and diglycerides and lecithin are used in equal proportions.

Emulsion stabilizers are used in creamer powders to increase the stability of the emulsion and/or to aid in the maintenance of pH. Non-chemical and/or chemical stabilizers may be used in the present invention. The chemical stabilizers may comprise mineral citrates, mineral carbonates, mineral bicarbonates and/or mineral phosphates. The term "mineral" may comprise sodium, potassium, magnesium, aluminum, and/or calcium, and combinations thereof. Dipotassium phosphate and sodium citrate are preferred emulsion stabilizers in the present invention. The composition should include up to approximately 2% by weight emulsion stabilizers.

The creamer powder composition of the present invention may include additives to enhance the production, nutritional value, quality, and/or flavor of the creamer powder. The present invention also may contain additives that typically are used in the formulation of powdered creamer compositions, such as anti-caking agents and whitening agents. The optional additives may be chosen as appropriate for the food product to be prepared.

EXAMPLES

The following examples illustrate embodiments of the present invention, but are not meant in any way to restrict the effective scope of the invention. All parts and percentages are by weight unless otherwise noted.

Example 1

Composition of a Low-carbohydrate High-protein Creamer Powder

| | |
|---|---:|
| High oleic sunflower oil | 50.7% |
| Calcium caseinate protein | 44.6% |
| Lecithin (74% fat) | 1.8% |
| Mono- and diglycerides | 1.8% |
| Dipotassium phosphate | 1.1% |
| | 100.0% |

Example II

Composition of a Low-carbohydrate High-protein Creamer Powder: Soy Protein Isolate

| | |
|---|---:|
| High oleic sunflower oil | 50.7% |
| Soy protein isolate | 44.6% |
| Lecithin (74% fat) | 1.8% |
| Mono- and diglycerides | 1.8% |
| Dipotassium phosphate | 1.1% |
| | 100.0% |

Example III

Low-carbohydrate High-protein Creamer Powder: Protein Mixture

| | |
|---|---:|
| High oleic sunflower oil | 50.7% |
| Calcium caseinate protein:soy protein isolate:whey protein isolate (1:1:1) | 44.60% |
| Lecithin (74% fat) | 1.80% |
| Mono- and diglycerides | 1.80% |
| Dipotassium phosphate | 1.10% |
| | 100.00% |

Example IV

Dry Mix for Instant Soup (Beef Flavor) Using Low-carbohydrate High-protein Creamer Powder

| | |
|---|---:|
| Sunflower oil creamer powder (from EXAMPLE 1) | 66.00% |
| Beef flavor soup base (Superior Quality Foods, 2355 E. Francis, Ontario CA 91761) | 23.00% |
| Tomato powder | 2.00% |
| Carrot powder | 2.00% |
| Cabbage powder | 2.00% |
| Broccoli powder | 2.00% |
| Potato flakes | 1.00% |
| Parsley flakes, dehydrated | 1.00% |
| Corn starch (buffalo) | 1.00% |
| | 100.00% |

Example V

Dry Mix for Instant Soup (Vegetable Flavor) Using Low-carbohydrate High-protein Creamer Powder

| | |
|---|---:|
| Sunflower oil creamer powder (EXAMPLE 1) | 62.00% |
| Vegetable base NMIDI (Superior Quality Foods) | 31.00% |
| Carrot powder - 60 | 3.00% |
| Parsley flakes, dehydrated | 2.00% |
| Corn starch (buffalo) | 2.00% |
| | 100.00% |

Example VI

Dry Mix for Instant Soup (Chicken Flavor) Using Low-carbohydrate High-protein Creamer Powder

| | |
|---|---:|
| Sunflower oil creamer powder (EXAMPLE 1) | 67.00% |
| Chicken FIV soup base (Superior Quality Foods, CFB LAS, SQF #909-923-733 | 29.00% |
| Corn starch (buffalo) | 3.00% |
| Parsley flakes, dehydrated | 1.00% |
| | 100.00% |

Example VII

Low-carbohydrate High-protein Creamer Powder Used in a Beverage

| | |
|---|---:|
| Calcium caseinate | 48.50% |
| Low-carbohydrate creamer powder (EXAMPLE 1) | 30.00% |
| Whey protein isolate | 12.70% |
| Natural flavors | 3.50% |
| Vitamins and minerals | 5.20% |
| Gums | 0.10% |
| | 100.00% |

While the invention is susceptible to various modifications and alternative forms, specific examples thereof have been shown by way of example and are herein described in detail. It should be understood, however, that the invention is not to be limited to the particular forms or methods disclosed; but to the contrary, the invention is to cover all modifications, equivalents, and alternatives falling within the spirit and scope of the appended claims.

What is claimed is:

1. A creamer powder composition comprising:
    between approximately 40% and approximately 60% by weight water-soluble protein;
    edible fat;
    at least one emulsifier; and
    at least one stabilizer, wherein the creamer powder composition comprises less than 5% carbohydrate and is dispersible in water-based liquids.

2. The creamer powder of claim 1, wherein the water-soluble protein component is animal-derived protein.

3. The creamer powder of claim 2, wherein the animal-derived protein is selected from the group consisting of caseinate soluble protein derived from milk product, whey protein, de-mineralized whey protein, collagen, albumin, and gelatin.

4. The creamer powder of claim 3, wherein the caseinate soluble protein derived from milk product is selected from the group consisting of at least one of calcium, sodium, magnesium, and potassium mineral salts of casein.

5. The creamer powder of claim 1, wherein the water-soluble protein component is a plant-derived protein.

6. The creamer powder of claim 5, wherein the plant-derived protein is selected from the group consisting of soybean protein, sunflower protein, flax protein, canola protein, oat protein, pea protein, wheat protein, and rice protein.

7. The creamer powder of claim 1, wherein the edible fat is a vegetable oil.

8. The creamer powder of claim 7, wherein the vegetable oil is selected from the group consisting of sunflower oil, canola oil, soybean oil, safflower oil, olive oil, palm kernel oil, palm oil, coconut oil, rapeseed oil, corn oil, cocoabutter oil, corn oil, peanut oil, sesame oil, almond oil, mustard seed oil, and cottonseed oil.

9. The creamer powder of claim 1, wherein the edible fat is a high oleic vegetable oil.

10. The creamer powder of claim 1, wherein the edible fat substantially comprises long length chain triglycerides.

11. The creamer powder of claim 1, wherein the emulsifiers are selected from the group consisting of monoglycerides, diglycerides, lecithin, egg lecithin, and soy lecithin.

12. The creamer powder of claim 1, wherein the stabilizing salts are selected from the group consisting of mineral citrates, mineral carbonates, mineral bicarbonates, and mineral phosphates.

13. A creamer powder comprising:
    between approximately 40% and approximately 60% by weight water-soluble protein component;
    between approximately 30% and approximately 70% by weight vegetable oil;
    between 0% and approximately 5% by weight carbohydrate;
    between approximately 2% and approximately 10% by weight monoglycerides and diglycerides as emulsifiers;
    up to approximately 2% by weight lecithin as an additional emulsifier; and
    up to approximately 2% by weight stabilizers comprising dipotassium phosphate, sodium citrate, mineral citrates, mineral carbonates, mineral bicarbonates and mineral phosphates,
    wherein optional additives are selected comprising flavoring, nutritional supplementation, herbs, coloring, thickeners, vitamins, antioxidants, nucleic acids, amino acids, sweeteners, artificial sweeteners, gums, minerals, fiber, salts, pH adjustment agents, anti-caking agents, anti-foaming agents, foaming agents, natural preservatives, chemical preservatives, and whitening agents.

14. A food product containing the creamer powder of claim 1.

15. A food product containing the creamer powder of claim 13.

* * * * *